United States Patent
Pedersen

(10) Patent No.: US 6,959,775 B2
(45) Date of Patent: Nov. 1, 2005

(54) DRILL BIT

(75) Inventor: Hans Christian Pedersen, Hurup (DK)

(73) Assignee: Irwin Industrial Tool Company, Huntersville, NC (US)

( * ) Notice: Subject to any disclaimer, the term of this patent is extended or adjusted under 35 U.S.C. 154(b) by 287 days.

(21) Appl. No.: 10/221,087
(22) PCT Filed: Feb. 14, 2001
(86) PCT No.: PCT/DK01/00103
§ 371 (c)(1), (2), (4) Date: Mar. 4, 2003
(87) PCT Pub. No.: WO01/66902
PCT Pub. Date: Sep. 13, 2001

(65) Prior Publication Data
US 2003/0138305 A1 Jul. 24, 2003

(30) Foreign Application Priority Data
Mar. 10, 2000 (DK) .......................... 2000 00393

(51) Int. Cl.⁷ .............................................. E21B 10/44
(52) U.S. Cl. ........................ 175/394; 175/415; 175/427; 175/435
(58) Field of Search ................................. 175/394, 395, 175/401, 415, 420.1, 427, 435

(56) References Cited

U.S. PATENT DOCUMENTS 6,431,295 B1 * 8/2002 Kleine et al. ............... 175/415

FOREIGN PATENT DOCUMENTS

EP 0352215 A2 * 1/1990

* cited by examiner

Primary Examiner—Zakiya Walker
(74) Attorney, Agent, or Firm—Dennis J. Williamson; Moore and Van Allen PLLC

(57) ABSTRACT

A drill comprising a shank part (11), which is adapted to be received in a drill holder of a drilling machine, and an opposite cutting end part (13). An intermediate fluted part (12) is provided, which defines at least one helical flute or channel (16) having a bottom surface (19) and a pair of opposite side surfaces (20) defined by the ribs or lands (17). The shape of a cross-section of the at least one flute or channel, taken at right angles to the course of the flute or channel, is such that the distance from a reference plane (24) to the bottom surface or the flute is decreasing from a central part (22) of the bottom surface towards the adjacent side surface (20) of the flute. The reference plane is at right angles to a radial line (25) extending from the longitudinal axis of the drill and through the centre of the bottom surface width. A helically extending groove (21) is formed in the middle of the central part (22) of the bottom surface (19).

28 Claims, 3 Drawing Sheets

A - A

DRILL BIT

Applicant claims, under 35 U.S.C. §§ 120 and 365, the benefit of priority of the filing date of Feb. 14, 2001 of a Patent Cooperation Treaty patent application, copy attached, Serial No. PCT/DK01/00103, filed on the aforementioned date, the entire contents of which are incorporated herein by reference, wherein Patent Cooperation Treaty patent application Serial No. PCT/DK01/00103 was published under PCT Article 21(2) in English.

Applicant claims, under 35 U.S.C. § 119, the benefit of priority of the filing date of Mar. 10, 2000 of a Danish patent application, Serial Number PA 2000 00393, filed on the aforementioned date, the entire contents of which are incorporated herein by reference.

The present invention relates to a drill, especially of the percussive type, such as a hammer drill. Such a drill comprises a shank part, which is adapted to be received in a drill holder of a drilling machine, an opposite cutting end part provided with a cutting member made from hard metal, such as cemented or sintered carbide, and an intermediate fluted part defining at least one helical flute or channel. The cutting member is usually a plate-like member, which is received in a diametrical slit or slot formed in the cutting end part and soldered in position. During drilling operation the drill is rotated and possibly also axially reciprocated. The material or bore meal loosened by the sintered carbide member at the inner end of the hole being drilled has to be transported out from the bore hole by means of the flutes or channels. Therefore, an efficient operation of a drill is dependent on, e.g., the efficiency at which the bore meal or bore dust is transported out from the hole being drilled.

Examples of known drills are disclosed in U.S. Pat. Nos. 2,635,856, 4,210,215, 4,314,616, 4,765,419, 5,423,640, 5,492,187, DE 297 24 063 U1, DE 39 08 674, EP 0 352 215, and German Offenlegungsschrift No. 197 53 731.

The present invention provides improvements of prior art drills. Thus, according to a first aspect the present invention provides a drill comprising a shank part adapted to be received in a drill holder of a drilling machine, an opposite cutting end part, and an intermediate fluted part defining at least one helical flute or channel having a bottom surface and a pair of opposite side surfaces, the shape of a cross-section of said at least one flute or channel taken at right angles to the course of the flute or channel being such that the distance from a reference plane to the bottom surface of the flute is decreasing from a central part of the bottom surface towards the adjacent side surface of the flute, said reference plane being at right angles to a radial line extending from the longitudinal axis of the drill and through the centre of the bottom surface width.

In order to facilitate transport of bore dust or bore meal out of the hole being drilled it is important to form the flute(s) or channel(s) in the fluted part with a maximum cross-sectional area without unduly weakening the strength of this part. In the drill according to the invention the cross-sectional area of the flute may be increased substantially without weakening the core section of the fluted part.

The said decreasing distance may be obtained by a stepped configuration of the channel bottom. In the preferred embodiment, however, the said distance from the reference plane is decreasing continuously. Thus, the cross-sectional shape of each flute bottom section extending between said central part and the respective adjacent side surface may be slightly concave, but it is preferably convex or substantially rectilinear.

When the cross-sectional shape of each flute bottom section is substantially rectilinear or slightly concavely or convexly curved it may define an angle within the range of 1°–15° with a plane parallel to said reference plane. Preferably, said angle range is 4°–8° and more preferred about 6°.

Another possibility for increasing the cross-sectional area of the flute or channel is to reduce the width of the land or rib separating adjacent flutes or channels. Thus, the cross-sectional shape of the flute or channel may be such that the peripheral width of the flute is increasing in a radially outward direction. This means that the width of the lands or ribs separating the flutes or channels is decreasing in a radially outward direction. As an example, at least one of the flute side surfaces in said cross-sectional shape may define an angle within the range of 1°–12°, preferably 2°–10° with a normal to said reference plane. Preferably the said angle is within the range of 6°–8°, more preferred about 7°.

The said flute bottom sections each extending between the central part of the bottom and the adjacent side surface of the flute or channel may be different. Thus, for example, one may have a slightly concave and the other may have a convex cross-sectional shape. In the preferred embodiment, however, the cross-sectional shape of the flute or channel is symmetrical about said radial line.

In order to increase the surface area of the flute or channel and thereby improve guidance or direction of the bore dust flow along the helically extending flute or channel a helically extending groove may be defined in the central part of the flute bottom surface. Such groove may have any cross-sectional shape, such as semi-circular. In the preferred embodiment, however, said groove has a cross-sectional shape defining an angle within the range of 80°–110°, more preferred 85°–100°, such as 90°.

The drill according to the invention may further comprise a neck part located axially between the shank part and the fluted part and having a reduced outer diameter in relation to these adjacent parts. This means that the discharge end of each flute or channel may open into the space around such neck part.

As mentioned above, the cutting end part of the drill may define a diametrically extending slit or slot opening at the free end of said end part, and the drill may then further comprise a plate-like cutting member of hard metal, which has an outer free end surface, an opposite inner end surface, a pair of opposite broad side surfaces, a pair of transverse, narrow side surfaces, and the cutting member may be received in said slot so as to extend axially and radially there from. The cutting member is fastened to said end part, for example by fusing or soldering. The free end surface of the cutting member defines a pair of substantially diametrically extending main cutting edges, and each of said narrow side surfaces defines a pair of substantially axially extending side cutting edges, a leading part, in relation to said direction of rotation, each of said broad side surfaces adjacent to a side cutting edge being exposed and defining a recess, which extends axially from the outer free end surface of the cutting member to an adjacent open end of one of said flutes or channels.

This axially extending recess facilitates transfer of bore meal or bore dust loosened by the cutting member into the adjacent flute end.

The cross-sectional shape of the surface defining the recess may be plane or slightly convex. However, in order to increase the cross-sectional area of the recess the cross-sectional shape is preferably concave. The transfer of bore meal or bore dust into the adjacent flute or channel may be further improved when said recess formed in the cutting member continues axially inwardly into the fluted part of the drill and merges with an adjacent flute end so as to widen the same.

The transfer of bore meal into the adjacent flute or channel may also be facilitated when the pitch of the helical flutes or channels adjacent to the cutting end of the drill is substantially increased in relation to the remaining parts thereof, because the risk of packing of the bore meal within the flutes or channels is reduced. The pitch adjacent to the cutting end may be increased to any suitable extent. However, it has been found that the pitch is advantageously increased to about the double of the pitch of the flute part adjacent to the shank part.

The part of the outer free end surface of the cutting member located at the leading side, in relation to said direction of rotation of the drill, of each main cutting edge may be concavely curved so as so form a path for bore meal or bore dust opening into one of said recesses. Thereby the transfer of bore dust into the flutes or channels may be further improved.

The outer free end surface of the cutting member may further define secondary cutting edges extending transversely to and intersecting the main cutting edges substantially at the longitudinal, central axis of the drill, and the outer free end surface may further define a centre tip projecting axially along the longitudinal axis of the drill. Such axially projecting tip makes it easier to centre the drill and thereby to start drilling of a hole at a predetermined marked position.

In order to reduce friction between the drill and the peripheral wall of the bore hole while at the same time obtaining a good guidance of the drill in the bore hole, a leading part, in relation to said direction of rotation of the drill, of each of said narrow side surfaces of the cutting member may have a substantially rectilinear cross-sectional shape extending at right angles to the longitudinal axis of the drill, while a trailing part has a concave cross-sectional shape. Preferably, the radius of curvature of said trailing part is substantially smaller than half the diametric distance between said pair of side cutting edges. Thus, only said leading parts of the narrow side surfaces are in contact with the wall of the bore hole.

Furthermore, in order to reduce stresses, the inner end surface of the cutting member may comprise a bevelled surface part adjacent to each of the broad side surfaces, the bottom surface of said slit or slot being complementary to the inner end surface of the cutting member.

According to a second aspect the present invention provides a drill adapted to be rotated in a predetermined direction and comprising a shank part adapted to be received in a drill holder of a drilling machine, an opposite cutting end part defining a diametrically extending slit or slot opening at the free end of said end part, an intermediate fluted part defining a pair of co-extending helical flutes or channels, a plate-like cutting member of hard metal, which has an outer free end surface, an opposite inner end surface, a pair of opposite broad side surfaces, a pair of transverse, narrow side surfaces, and is received in said slot so as to extend axially and radially there from, and which is fastened to said end part, said free end surface of the cutting member defining a pair of substantially diametrically extending main cutting edges, and each of said narrow side surfaces defining a pair of substantially axially extending side cutting edges, a leading part, in relation to said direction of rotation, of each of said broad side surfaces adjacent to a side cutting edge being exposed and defining a recess, which extends axially from the outer free end surface of the cutting member to an adjacent open end of one of said flutes or channels.

BRIEF DESCRIPTION OF THE FIGURES

The invention will now be further described with reference to the figures, wherein.

DETAILED DESCRIPTION OF THE FIGURES

Figure 1:
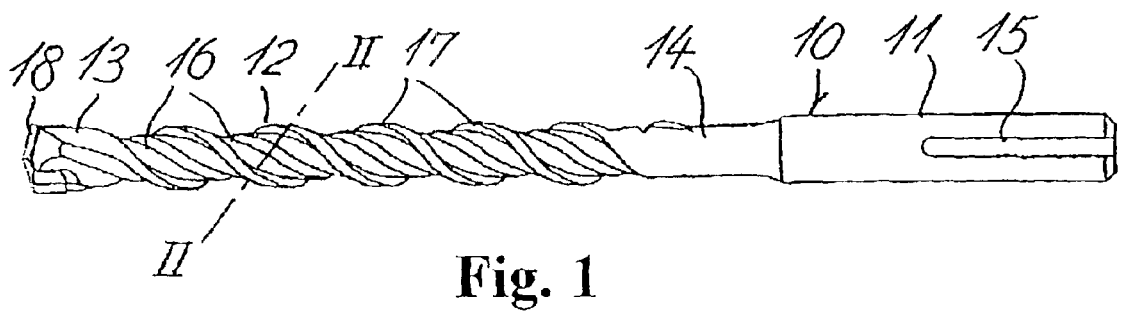
FIG. 1 is a side view of a hammer drill according to the invention.

The hammer drill 10 shown in FIG. 1 comprises a shank part 11 adapted to be received in the drill holder of a drilling machine (not shown), a fluted part 12, a cutting end 13 and a neck part 14 provided between the shank part 11 and the fluted part 12 and having a reduced diameter in relation to the outer diameter of the adjacent parts 11 and 12.

The shank part 11 may be provided with conventional locking grooves (not shown) and driving channels 15. The fluted part 12 defines a pair of coextending, helical flutes or channels 16, which are separated by helically extending ribs or lands 17. The cutting end 13 comprises a plate-like cutting member 18 which is received and fastened in a diametric slit or slot formed in the cutting end 13 in a conventional manner.

Figure 2:
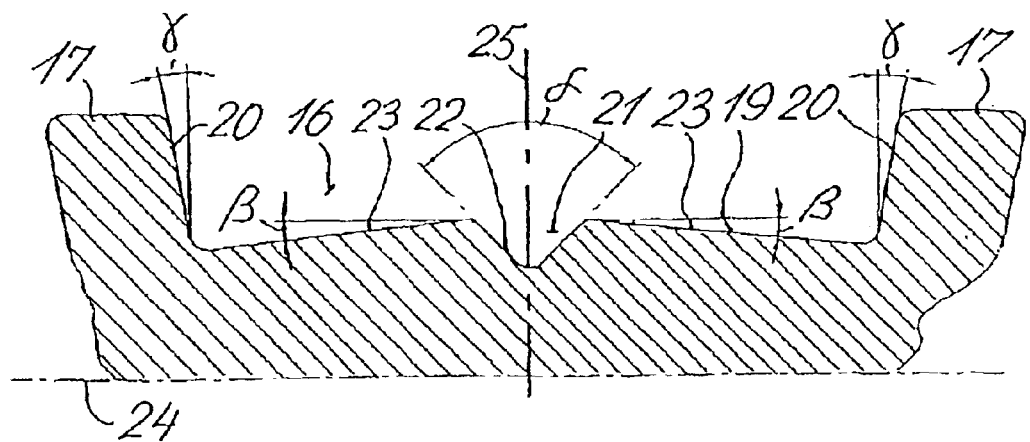
FIG. 2 shows in an enlarged scale a cross-sectional view taken along the lines II—II in FIG. 1.

FIG. 2 illustrates a cross-section of one of the flutes 16 taken a right angles to the tangential direction of the helical course of the flute as illustrated by the line 11—11 in FIG. 1. As shown in FIG. 2 each flute or channel 16 is defined by a bottom surface 19 and a pair of opposite side surfaces 20 defined by the ribs or lands 17. A helically extending groove 21 is formed in the middle of a central part 22 of the bottom surface 19, and the groove is defined by side surfaces defining an angle α, which may, e.g., be about 90°. The bottom surface 19 further comprises a pair of inclined bottom sections each defining an angle β with a line parallel to a reference line which is indicated by a dot- and dash-line 24 in FIG. 2. The reference line 24 indicates the cross-section of a reference plane which extends at right angles to a radial line 25, which extends from the longitudinal axis of the drill and through the middle of the cross-section of the flute 16. The angle β may, e.g., be 4°–8° and preferably about 60°. The peripheral width of the channel or flute 16 may increase in a radially outward direction so that each of the side surfaces 20 defines an angle γ with a line being parallel to the radial line 25. As an example, the angel γ may be 6°–8° and is preferably about 7°. It is to be understood that because of the angles α, β, and γ discussed above, the cross-sectional area of the flute or channel 16s increased without substantially impairing the strength of the drill. The enlarged cross-sectional area of the flute 16 allows for a more efficient transport of bore meal or bore dust from the cutting end 13 and out from the hole being drilled.

Figure 3:
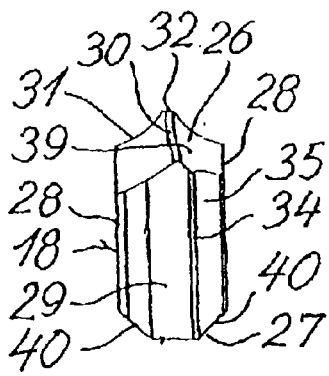
FIGS. 3–5 is an end view, a side view and a top view, respectively of a cutting member of the drill of FIG. 1 shown in an enlarged scale.
Figure 4:
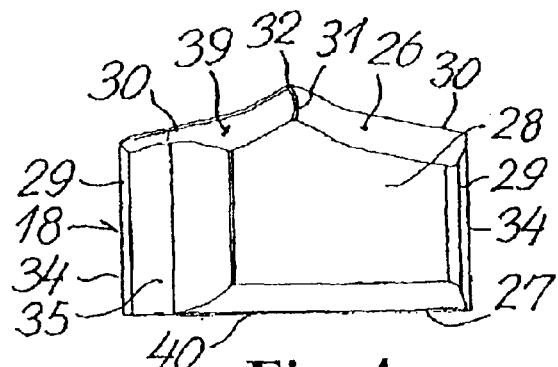
Figure 5:
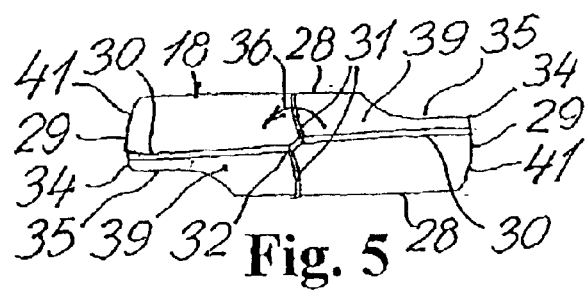

FIGS. 3–5 illustrate the plate-like cutting member 18 more in detail. The cutting member has axially outer and inner end surfaces 26 and 27, a pair of opposite broad side surfaces 28 and a pair of opposite or peripheral side surfaces 29. The axially outer end surface 26 defines a pair of substantially diametrically (in relation to the drill, in which it is mounted) extending main cutting edges 30 and a pair of secondary cutting edges 31, which extend transversely to and cross the main cutting edges at a crossing point forming an axially protruding tip 32 which is located on the central longitudinal axis 33 of the drill, vide FIGS. 6–8. As best seen in FIGS. 3 and 4, the cutting edges 30 and 31 has a concavely curved shape.

Each of the opposite peripheral side surfaces 29 of the cutting member 18 defines a longitudinally extending side cutting edge 34, and the radial distance between the longitudinal axis 33 of the drill and each of the cutting edges 34 determines the radius of a bore hole to be drilled. An axially extending recess 35 is formed in each of the board side surfaces 28 adjacent to the side cutting edge 34, and the drill is rotated in the direction indicated by an arrow 36 in FIG. 5. This means, that the recesses 35 are formed on the leading parts of the side surfaces 28.

Figure 6:
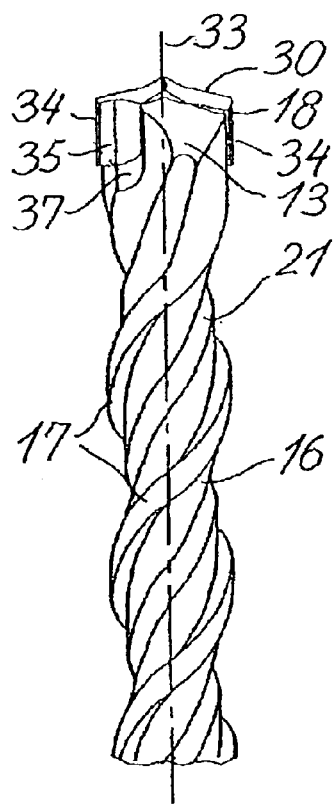
FIGS. 6 and 7 are enlarged side views of an end portion of the drill shown in FIG. 1 with and without a cutting member mounted thereon, respectively.
Figure 7:
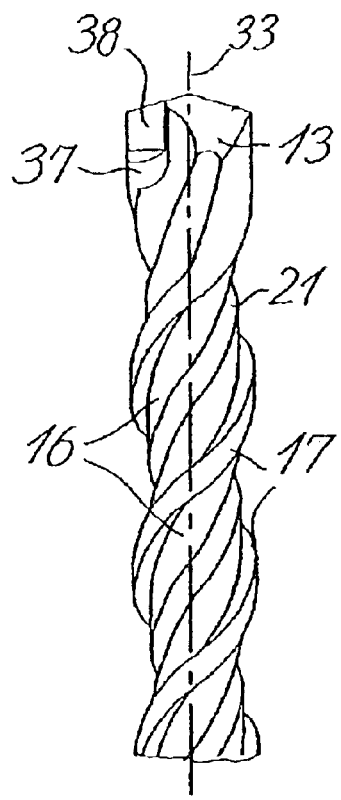

A further recess 37 is formed in the cutting end 13 of the drill such that, when the cutting member 18 has been mounted in a radially extending slit or slot 38 as shown in FIG. 6, the recess 35 in the cutting member 18 will be exposed and continue into the recess 37. As best seen in FIGS. 6 and 7 the pitch of the flute or channel 16 is substantially increased adjacent to the cutting end 13 such that the flute 16 extends more axially at this location. Furthermore, the recesses 35 and 37 are shaped so as to merge gently into the adjacent flute or channel 16. Furthermore, the part 39 of the cutting member end surface 26 is concavely curved so as to form a kind of trough for guiding material or bore dust loosened by the adjacent main cutting edge 30 into the recess 35.

As best shown in FIG. 3, the axially inner end surface 27 of the cutting member 18 has opposite bevelled or chamfered parts 40 for engaging with a similar shaped bottom surface of the slot 38. Furthermore, the trailing part 41 of each peripheral side surface 29 is concavely curved and has a radius of curvature being substantially smaller than the radius of the drill, so as to obtain a clearance between the wall of a bore hole and the said surface part.

Figure 8:
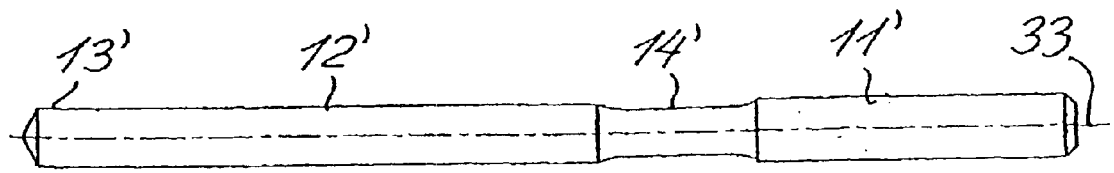
FIG. 8 is a side view of a drill blank having a neck part of reduced diameter.

FIG. 8 shows a sample 10', from which a drill according to present invention may be made. The sample 10' comprises a shank part 11', a neck part 14' of reduced diameter, and a part 12' to be provided with helically extending flutes or channels, and a free end part 13' which may be formed with a slit or slot for receiving a cutting member 32 as described above. The necessary channels and grooves may be formed in the shank part 11' by milling or grinding, and helical flutes or channels may be formed in the part 12' by grinding or by rolling in a conventional manner.

Figure 9:
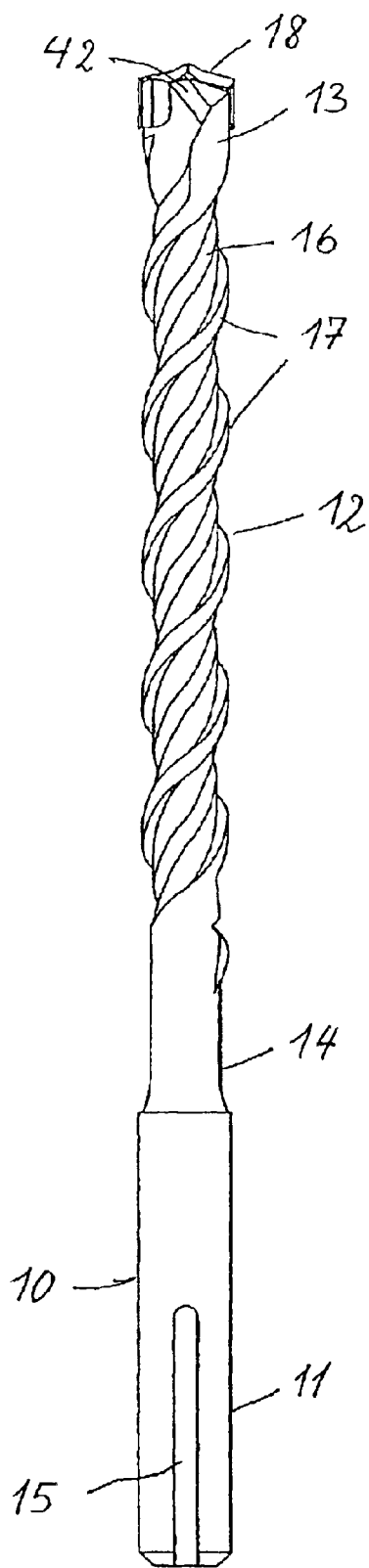
FIG. 9 is a side view of a hammer drill according to the invention.

The hammer drill 10 shown in FIG. 9 comprises a shank part 11 adapted to be received in the drill holder of a drilling machine (not shown), a fluted part 12, a cutting end 13 and a neck part 14 provided between the shank part 11 and the fluted part 12 and having a reduced diameter in relation to the outer diameter of the adjacent parts 11 and 12. The shank part 11 is provided with conventional locking grooves (not shown) and driving channels 15. The fluted part 12 defines a pair of coextending, helical flutes or channels 16, which are separated by helically extending ribs or lands 17. The cutting end 13 comprises a plate-like cutting member 18 which is received and fastened in a diametric slit or slot formed in the cutting end 13 in a conventional manner.

The hammer drill of FIGS. 9–12 differs from that of FIG. 1 in that is has a different formed cutting end 13. A recess 42 is formed in the cutting end 13 of the drill such that it together with the part 39 of the cutting member end surface 26 form a kind of trough for guiding material or bore dust loosened by the adjacent main cutting edge 30 into the channel 16.

A combination of the drills shown in FIGS. 1 and 9 may be provided, such that the drill both comprises the recess 37 (FIG. 6) and the recess 42 (FIG. 9).

There is a distance (D) between the upper edge of the cutting end 13 and an upper edge of the board side surfaces 28, so as to make space for the soldering between the cutting member and the cutting end.

Figure 10:
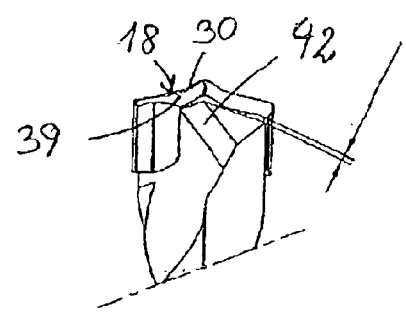
FIGS. 10 and 11 are enlarged side views of an end portion of the drill shown in FIG. 9 with and without a cutting member mounted thereon, respectively.
Figure 11:
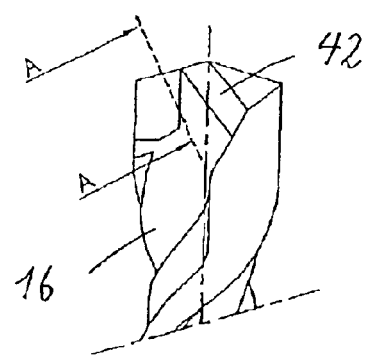

FIGS. 10 and 11 are enlarged side views of an end portion of the drill shown in FIG. 9 with and without a cutting member 18 mounted thereon, respectively.

Figure 12:
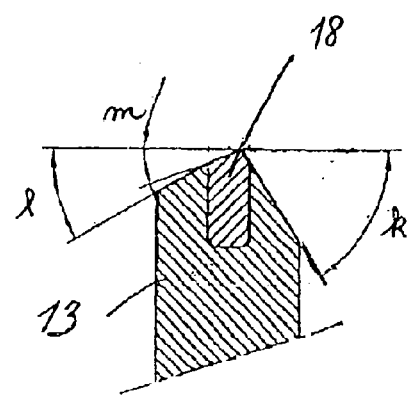
FIG. 12 is a cross-sectional view taken along the lines A—A in FIG. 11.

FIG. 12 is a cross-sectional view taken along the lines A—A in FIG. 11. The angle k is preferably 60°, the angle I is preferably 30°, and the angle m is preferably 20°.

It should be understood, that various changes and modifications of the embodiment described above may be made within the scope of the present invention. As an example, the drill need not necessarily be provided with a cutting member 18 as described above and also with flutes or channels 16 having the new cross-sectional shape described. Thus, a drill having flutes shaped in accordance with the present invention may be provided with a conventional cutting member or a drill having conventional flutes or channels may be provided with the new cutting member.

What is claimed is:

1. A drill adapted to be rotated in a predetermined direction, comprising:
   a shank part adapted to be received in a drill holder of a drilling machine,
   an opposite cutting end part defining a diametrically extending slit or slot opening at a free end of said end part,
   an intermediate fluted part defining a pair of co-extending helical flutes or channels, and
   a plate-like cutting member of hard metal, which has an outer free end surface, an opposite inner end surface, a pair of opposite broad side surfaces, a pair of transverse, narrow side surfaces, and is received in said slot so as to extend axially and radially therefrom, and which is fastened to said end part, said free end surface of the cutting member defining a pair of substantially diametrically extending main cutting edges, and each of said narrow side surfaces defining a pair of substantially axially extending side cutting edges, a leading part, in relation to said direction of rotation, of each of said broad side surfaces adjacent to a side cutting edge being exposed and defining a recess, which extends axially from the outer free end surface of the cutting member to an adjacent open end of one of said flutes or channels.

2. A drill according to claim 1, wherein said recess formed in the cutting member continues axially inwardly into the fluted part of the drill and merges with an adjacent flute end so as to widen the adjacent flute end.

3. A drill according to claim 1, wherein a pitch of the helical flutes or channels adjacent to the cutting end of the drill is substantially increased in relation to a pitch at the shank part and the intermediate fluted part.

4. A drill according to claim 3, wherein the pitch adjacent to the cutting end is increased to about the double of a pitch of the flute part adjacent to the shank part.

5. A drill according to claim 1, wherein the outer free end surface defines a center tip projecting axially along a longitudinal axis of the drill.

6. A drill adapted to be rotated in a predetermined direction, comprising:
- a shank part adapted to be received in a drill holder of a drilling machine,
- an opposite cutting end part defining a diametrically extending slit or slot opening at a free end of said end part,
- an intermediate fluted part defining a pair of co-extending helical flutes or channels, and
- a plate-like cutting member of hard metal, which has an outer free end surface, an opposite inner end surface, a pair of opposite broad side surfaces, a pair of transverse, narrow side surfaces, and is received in said slot so as to extend axially and radially therefrom, and which is fastened to said end part, said free end surface of the cutting member defining a pair of substantially diametrically extending main cutting edges, and each of said narrow side surfaces defining a pair of substantially axially extending side cutting edges, a leading part, in relation to said direction of rotation, of each of said broad side surfaces adjacent to a side cutting edge being exposed and defining a recess, which extends axially from the outer free end surface of the cutting member to an adjacent oven end of one of said flutes or channels, wherein said recess has a concave cross-sectional shape.

7. A drill adapted to be rotated in a predetermined direction, comprising:
- a shank part adapted to be received in a drill holder of a drilling machine,
- an opposite cutting end part defining a diametrically extending slit or slot opening at a free end of said end part,
- and intermediate fluted part defining a pair of co-extending helical flutes or channels, and
- a plate-like cutting member of hard metal, which has an outer free end surface, an opposite inner end surface, a pair of opposite broad side surfaces, a pair of transverse, narrow side surfaces, and is received in said slot so as to extend axially and radially therefrom, and which is fastened to said end part, said free end surface of the cutting member defining a pair of substantially diametrically extending main cutting edges, and each of said narrow side surfaces defining a pair of substantially axially extending side cutting edges, a leading part, in relation to said direction of rotation, of each of said broad side surfaces adjacent to a side cutting edge being exposed and defining a recess, which extends axially from the outer free end surface of the cutting member to an adjacent open end of one of said flutes of channels, wherein said recess has a concave cross-sectional shape and continues axially inwardly into the fluted part of the drill and merges with an adjacent flute end so as to widen the adjacent flute end.

8. A drill adapted to be rotated in a predetermined direction, comprising:
- a shank part adapted to be received in a drill holder of a drilling machine,
- an opposite cutting end part defining a diametrically extending slit or slot opening at a free end of said end part,
- an intermediate fluted part defining a pair of co-extending helical flutes or channels, and
- a plate-like cutting member of hard metal, which has an outer free end surface, an opposite inner end surface, a pair of opposite broad side surfaces, a pair of transverse, narrow side surfaces, and is received in said slot so as to extend axially and radially therefrom, and which is fastened to said end part, said free end surface of the cutting member defining a pair of substantially diametrically extending main cutting edges, and each of said narrow side surfaces defining a pair of substantially axially extending side cutting edges, a leading part, in relation to said direction of rotation, of each of said broad side surfaces adjacent to a side cutting edge being exposed and defining a recess, which extends axially from the outer free end surface of the cutting member to an adjacent open end of one of said flutes or channels, wherein a part of the outer free end surface located at a leading side, in relation to said direction of rotation, of each main cutting edge is concavely curved so as so form a path for bore meal or bore dust opening into one of said recesses.

9. A drill adapted to be rotated in a predetermined direction, comprising:
- a shank part adapted to be received in a drill holder of a drilling machine,
- an opposite cutting end part defining a diametrically extending slit or slot opening at a free end of said end part,
- an intermediate fluted part defining a pair of co-extending helical flutes or channels, and
- a plate-like cutting member of hard metal, which has an outer free end surface, an opposite inner end surface, a pair of opposite broad side surfaces, a pair of transverse, narrow side surfaces, and is received in said slot so as to extend axially and radially therefrom, and which is fastened to said end part, said free end surface of the cutting member defining a pair of substantially diametrically extending main cutting edges, and each of said narrow side surfaces defining a pair of substantially axially extending side cutting edges, a leading part, in relation to said direction of rotation, of each of said broad side surfaces adjacent to a side cutting edge being exposed and defining a recess, which extends axially from the outer free end surface of the cutting member to an adjacent open end of one of said flutes or channels, wherein the outer free end surface of the cutting member further defines secondary cutting edges extending traversely to and intersecting the main cutting edges substantially at a longitudinal, central axis of the drill.

10. A drill adapted to be rotated in a predetermined direction, comprising:
- a shank part adapted to be received in a drill holder of a drilling machine,
- an opposite cutting end part defining a diametrically extending slit or slot opening at a free end of said end part,
- an intermediate fluted part defining a pair of co-extending helical flutes or channels, and
- a plate-like cutting member of hard metal, which has an outer free end surface, an opposite inner end surface, a pair of opposite broad side surfaces, a pair of transverse, narrow side surfaces, and is received in said slot so as to extend axially and radially therefrom, and which is fastened to said end part, said free end surface of the cutting member defining a pair of substantially diametrically extending main cutting edges, and each of said narrow side surfaces defining a pair of substantially axially extending side cutting edges, a leading part, in relation to said direction of rotation, of each of said broad side surfaces adjacent to a side cutting edge being exposed and defining a recess, which extends axially from the outer free end surface of the cutting member to an adjacent open end of one of said flutes or channels, wherein a leading part, in relation to said direction of rotation, of each of said narrow side surfaces of the cutting member has a substantially rectilinear cross-sectional shape extending at right angles to a longitudinal axis of the drill, while a trailing part has a concave cross-sectional shape.

11. A drill according to claim 10, wherein a radius of curvature of said trailing part is substantially smaller than half the diametric distance between said pair of side cutting edges.

12. A drill adapted to be rotated in a predetermined direction, comprising:

a shank part adapted to be received in a drill holder of a drilling machine, an opposite cutting end part defining a diametrically extending slit or slot opening at a free end of said end part, an intermediate fluted part defining a pair of co-extending helical flutes or channels, and a plate-like cutting member of hard metal, which has an outer free end surface, an opposite inner end surface, a pair of opposite broad side surfaces, a pair of transverse, narrow side surfaces, and is received in said slot so as to extend axially and radially therefrom, and which is fastened to said end part, said free end surface of the cutting member defining a pair of substantially diametrically extending main cutting edges, and each of said narrow side surfaces defining a pair of substantially axially extending side cutting edges, a leading part, in relation to said direction of rotation, of each of said broad side surfaces adjacent to a side cutting edge being exposed and defining a recess, which extends axially from the outer free end surface of the cutting member to an adjacent open end of one of said flutes or channels, wherein the inner end surface of the cutting member comprises a bevelled surface part adjacent to each of the broad side surfaces, the bottom surface of said slit or slot being complementary to the inner end surface of the cutting member.

13. A drill adapted to be rotated in a predetermined direction, comprising:

a shank part adapted to be received in a drill bolder of a drilling machine, an opposite cutting end part defining a diametrically extending slit or slot opening at a free end of said end part, an intermediate fluted part defining a pair of co-extending helical flutes or channels, and a plate-like cutting member of hard metal, which has an outer free end surface, an opposite inner end surface, a pair of opposite broad side surfaces, a pair of transverse, narrow side surfaces, and is received in said slot so as to extend axially and radially therefrom, and which is fastened to said end part, said free end surface of the cutting member defining a pair of substantially diametrically extending main cutting edges, and each of said narrow side surfaces defining a pair of substantially axially extending side cutting edges, a leading part, in relation to said direction of rotation, of each of said broad side surfaces adjacent to a side cutting edge being exposed and defining a recess, which extends axially from the outer free end surface of the cutting member to an adjacent open end of one of said flutes or channels, wherein each flute or channel of the intermediate fluted part has a bottom surface and a pair of opposite side surfaces, a cross-sectional shape of said at least one flute or channel taken at right angles to a course of the flute or channel being such that a distance from a reference plane to the bottom surface of the flute decreases from a central part of the bottom surface towards an adjacent side surface of the flute, said reference plane being radially outside the flute bottom surface and at right angles to a radial line extending from a longitudinal axis of the drill and through a center of a bottom surface width.

14. A drill according to claim 13, wherein the said distance decreases continuously.

15. A drill according to claim 13, wherein the cross-sectional shape of each flute bottom section extending between said central part and the respective adjacent side surface is convex or concave.

16. A drill according to claim 15, wherein each of said bottom sections defines an angle within a range of from about 1° to about 15° with a plane parallel to said reference plane.

17. A drill according to claim 16, wherein said angle range is from about 4° to about 8° and preferably about 6°.

18. A drill according to claim 13, wherein the cross-sectional shape of each flute bottom section extending between said central part and the respective adjacent side surface is substantially rectilinear.

19. A drill according to claim 18, wherein each of said bottom sections defines an angle within a range of about 1° about 15° with a plane parallel to said reference plane.

20. A drill according to claim 19, wherein said angle range is from about 4° to about 8° and preferably about 6°.

21. A drill according to claim 13, wherein the cross-sectional shape of the flute or channel is such that a peripheral width of the flute increases in a radially outward direction.

22. A drill according to claim 21, wherein at least one of the flute side surfaces in said cross-sectional shape defines with a normal to said reference plane an angle within a range of from about 1° to about 12°, preferably from about 2° to about 10°.

23. A drill according to claim 22, wherein said angle is within a range of from about 6° to about 8°, preferably about 7°.

24. A drill according to claim 13, wherein a cross-sectional shape of the flute or channel is symmetrical about said radial line.

25. A drill according to claim 13, wherein a helically extending groove is defined in a central part of the flute bottom surface.

26. A drill according to claim 25, wherein said groove has a cross-sectional shape defining an angle within a range of 80°–110°, preferably 85°–100°, and most preferably about 90°.

27. A drill according to claim 13, further comprising a neck part positioned axially between a shank part and a fluted part and having a reduced outer diameter in relation to said shank part and said fluted part.

28. A drill adapted to be rotated in a predetermined direction, comprising:

a shank part adapted to be received in a drill holder of a drilling machine, an opposite cutting end part defining a diametrically extending slit or slot opening at a free end of said end part, and intermediate fluted part defining a pair of co-extending helical flutes or channels, and a plate-like cutting member of hard metal, which has an outer free end surface, an opposite inner end surface, a pair of opposite broad side surfaces, a pair of transverse, narrow side surfaces, and is received in said slot so as to extend axially and radially therefrom, and which is fastened to said end part, said free end surface of the cutting member defining a pair of substantially diametrically extending main cutting edges, and each of said narrow side surfaces defining a pair of substantially axially extending side cutting edges, a leading part, in relation to said direction of rotation, of each of said broad side surfaces adjacent to a side cutting edge being exposed and defining a recess, which extends axially from the outer free end surface of the cutting member to an adjacent open end of one of said flutes or channels, wherein said recess continues axially inwardly into the fluted pan of the drill and merges with an adjacent flute end so as to widen the adjacent flute end.

* * * * *